Dec. 23, 1958 J. J. RUDOLF, JR 2,866,180
HIGH SPEED INDICATOR

Filed May 2, 1955 3 Sheets-Sheet 1

INVENTOR
JOHN J. RUDOLF, JR.

BY Joseph E Ryan

ATTORNEY

Dec. 23, 1958  J. J. RUDOLF, JR  2,866,180
HIGH SPEED INDICATOR
Filed May 2, 1955  3 Sheets-Sheet 3
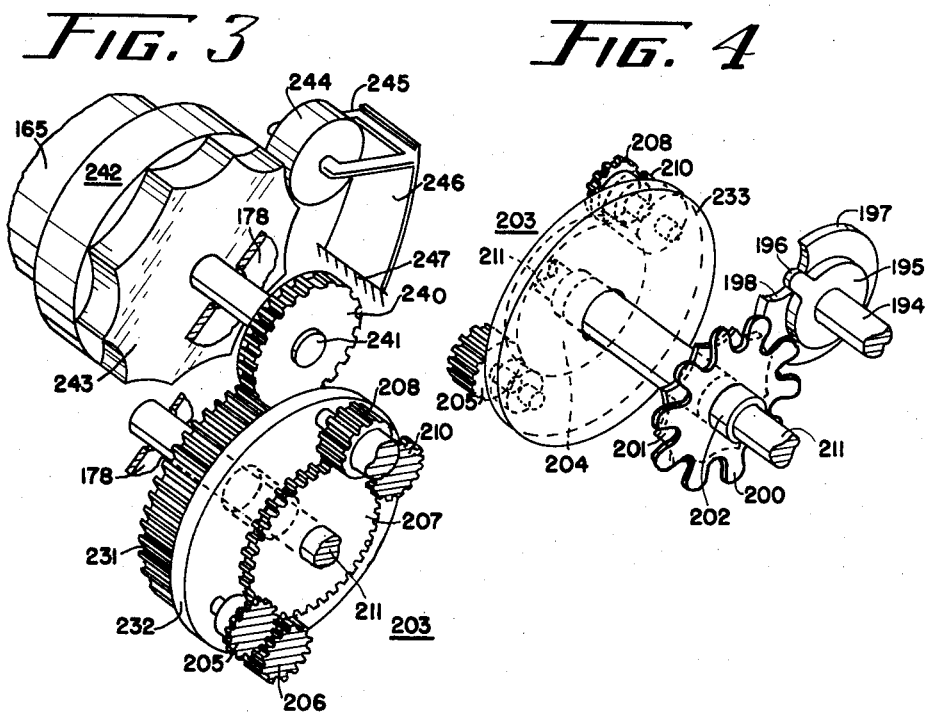
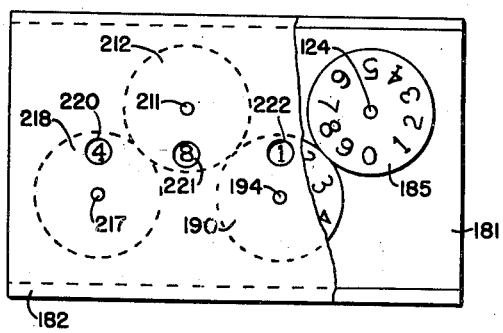
INVENTOR
JOHN J. RUDOLF, JR.
BY Joseph E Ryan
ATTORNEY

United States Patent Office 2,866,180
Patented Dec. 23, 1958

2,866,180

HIGH SPEED INDICATOR

John J. Rudolf, Jr., Hopkins, Minn., assignor to Minneapolis-Honeywell Regulator Company, Minneapolis, Minn., a corporation of Delaware Application May 2, 1955, Serial No. 505,461

8 Claims. (Cl. 340—177)

This application pertains to a digital type of indicator and more particularly to an indicator which is capable of following very rapid changes in the quantity being measured.

The need for digital or totalizer indication of measurable quantity is an ever growing one. As opposed to the more common dial-and-pointer type of indication, the digital method possesses two distinct advantages which are (1) for indications with a high degree of inherent accuracy the information can be presented in a more compact and easily readable form, and (2) for multiple indications of various different quantities which would require a variety of different dials and calibrations in a dial-and-pointer presentation, the digital method allows greater speed, accuracy, and ease of reading.

Digital indicators can logically be broken down into electrical and mechanical types which possess contrary features and drawbacks. Electronic indicators, which present information in terms of lighted lamps or tubes, are extremely fast acting but tend to be complex, bulky, and tedious to read due to the physical location of the individual lamps. Some electronic indicators present information in binary form in order to save space over the equivalent decimal form, but these require habitual knowledge of the code and are therefore not universally readable. Mechanical indicators, on the other hand, can be compact and easily read, but invariably suffer from the speed limitations imposed by mechanical elements themselves. Electronic indicators can easily count at rates in excess of 100,000 units per second whereas mechanical counters are particularly limited to rates in the order of 10,000 units per minute. Using these figures for the sake of an example, a count of 10,000 (assuming a four digit counter) could be registered in 0.1 second electronically or in 60 seconds mechanically.

The novel counter presented in this application results in a substantially more rapid acting device than the conventional mechanical counter without sacrificing the compactness, readability, and freedom from complex electronic circuitry inherent in the electronic type of counter.

It is an object of this invention to provide a high speed indicator capable of following rapid variations in the quantity being measured.

Another object is to provide an indicator which is automatically reset to correct for a sudden change of the quantity being measured.

Still another object is to provide an indicator capable of following rapid variations in a quantity being measured, while still being adequately damped.

Still a further object is to provide an indicator that can be used with numerous types of sensing devices.

These and other objects will become apparent from the reading of the following specification when considered with the attached drawings.

Figure 3 is a partial section, in perspective, of the differential coupling mechanism of the indicator and is taken along lines 3—3;

Figure 4 is a partial section, in perspective, of the differential coupling mechanism of the indicator taken along the lines 4—4;

Figure 5 is a cutaway view of the front of the totalizer indicator as viewed from 5—5.

This novel high speed indicator utilizes a sensing unit whose output is supplied to an amplifier. This amplifier has basically two outputs. The first output is fed to a discriminator output stage and indicator drive motor which, in turn, drives a velocity generator and a mechanical indicator. The output from the velocity generator then is fed back directly or through a nonliner means to the amplifier for stabilization or damping in a closed loop system. The indicator supplies a visual indication of the sensed quantity and also supplies a mechanical drive through differential gearing to rebalance the sensing unit. The amplifier's second output energizes a relay and a clutch when that output is above a fixed value. The clutch supplies a second input to the differential and drives the indicator and rebalances the system at a rate higher than when under normal operation. An embodiment of the system is hereafter described in detail.

Figure 1:
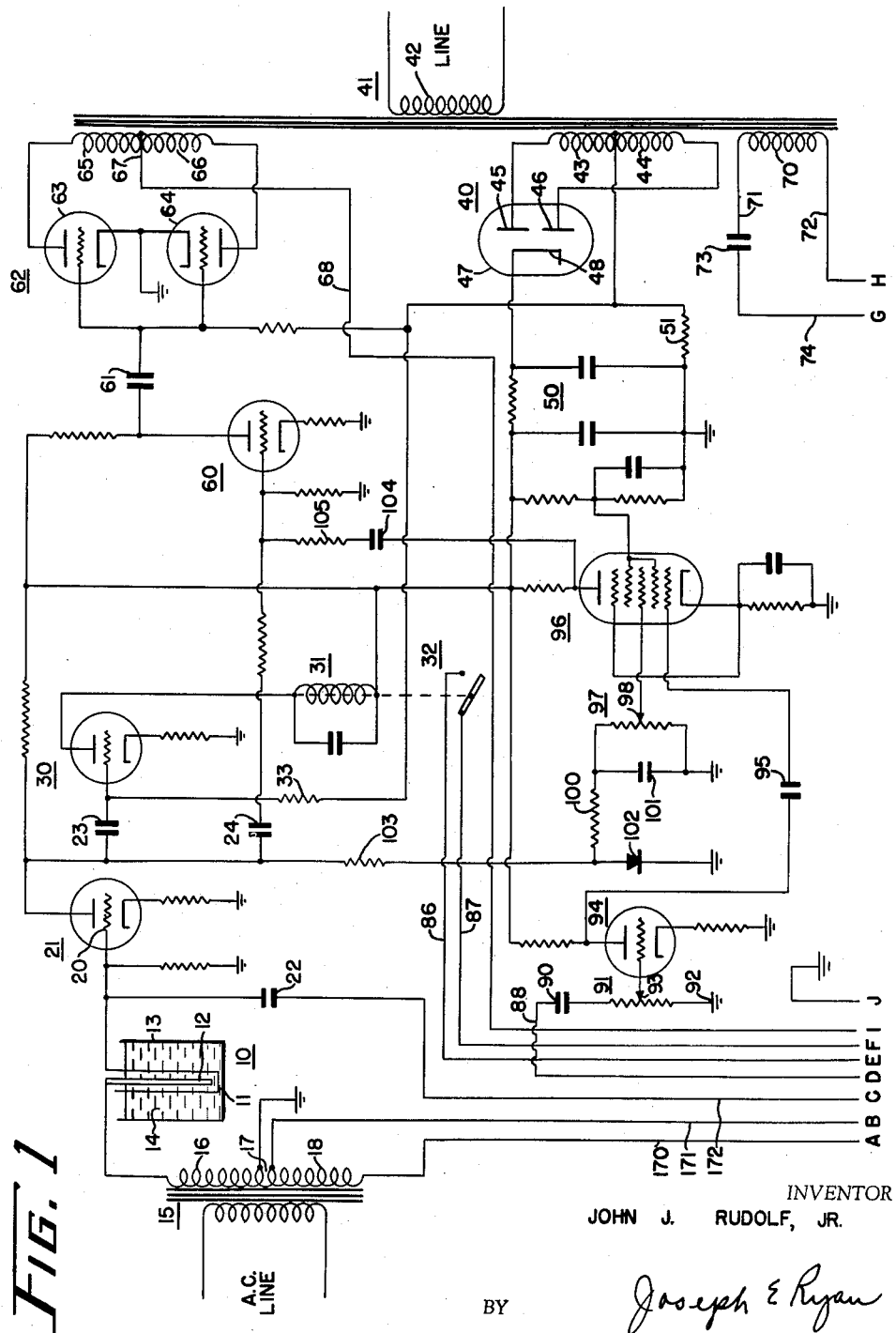
Figure 1 is a schematic drawing of a typical sensing device including the electronic circuits coupling the sensing device and the indicator.

In Figure 1 there is disclosed a fuel gage sensing unit 10 of a type generally disclosed in the C. R. Schafer et al. Patent 2,563,280. This unit consists of two electrodes 11 and 12 which form a capacitor. The electrodes 11 and 12 are submerged in a tank 13, such as a fuel tank, and which is filled with fuel 14. The effective electrical capacity of the sensing device 10 is varied in accordance with the level of the fuel 14 in the tank 13. The capacity sensing unit 10 forms one side of a bridge circuit which is supplied with an A. C. energization by transformer 15 and which has an output connected between grid 20 of tube 21 and ground. Condenser 22 forms an additional leg of the bridge circuit with a tapped secondary winding having sections 16, 17 and 18 of the transformer 15. The complete bridge circuit will be described in more detail below. In this bridge circuit however, it is apparent that as the level of the liquid 14 changes in container 13 the A. C. signal supplied to grid 20 of tube 21 varies.

Tube 21 with its associated components forms an amplifier which has two output coupling condensers 23 and 24. Coupling condenser 23 provides a signal to an amplifier generally shown at 30. The output of the amplifier 30 is utilized in a plate load relay shown at 31. The plate load relay 31 operates contacts generally shown at 32 which are normally open. The amplifier 30 is supplied with a bias voltage via resistor 33 from a power supply generally shown at 40. The power supply 40 is formed of the conventional components including a transformer 41 having a primary 42 and a center tapped secondary which is formed of winding sections 43 and 44. The winding sections 43 and 44 are connected to the plates 45 and 46 of a rectifier tube 47. The rectifier tube 47 further has the conventional cathode element 48. The output of the power supply is fed to a condenser resistor type filter shown generally at 50 and which is of the usual form. The filter network at 50 further contains a resistor 51 which provides the necessary bias for amplifier 30 via the resistor 33. The combined characteristics of the fixed bias applied across resistors 51 and 33, and the characteristics of the amplifier 30, when operating through a plate load relay 31, provide an amplifier operation which energizes the relay 31 at a fixed input signal level to amplifier 30. The level of energization of relay 31, which in turn closes contacts 32, can be established by the proper selection of the relay 31, the bias resistor 51, resistor 33, and the characteristics of the balance of the amplifier 30 and is well understood by those versed in the art. The function of the contacts 32 will be explained more fully below.

The second signal supplied from amplifier 21 through condenser 24 is connected to a conventional amplifier generally shown at 60. The output of the amplifier 60 is coupled through condenser 61 to a discriminator circuit generally shown at 62. This discriminator circuit is composed of tubes 63 and 64 and the winding sections 65 and 66 of the secondary windings of transformer 41. The discriminator shown at 62 is of a conventional nature and will not be described in detail. The output of the discriminator is taken at a center tap 67 on conductor 68 to a connector terminal I.

Transformer 41 contains an additional secondary winding 70. The output of the secondary 70 is fed to connectors G and H through conductors 71, 72, condenser 73, and conductor 74. Connectors G, H, and I direct the outputs shown in Figure 1 to the similarly lettered connectors disclosed in Figure 2. The connectors in Figure 2 form a cable 75. From cable 75 connectors G, H, and I lead to a two-phase induction indicator drive motor generally shown at 76 in Figure 2. The indicator drive motor contains windings 77 and 78 and a rotor 80 which are shown in phantom. Also, the units of Figure 1 and Figure 2 are grounded together by joint connectors J and cable 75.

It will best be seen that the indicator motor 76 is in the form of a conventional bidirectionally controllable motor and that transformer secondary 70 and phase shift condensers 73 provide a constant energization for the motor 76 through the connectors G and H. The output of the discriminator 62 through the center tap 67, conductor 68, and the connector I provides a control voltage across winding 78 to cause the motor 76 to rotate in one direction or the other depending on the phase of the output of the discriminator. It is further understood that when the discriminator is balanced there is no voltage supplied across winding 78 and the indicator motor 76 is therefore stationary.

Figure 2:
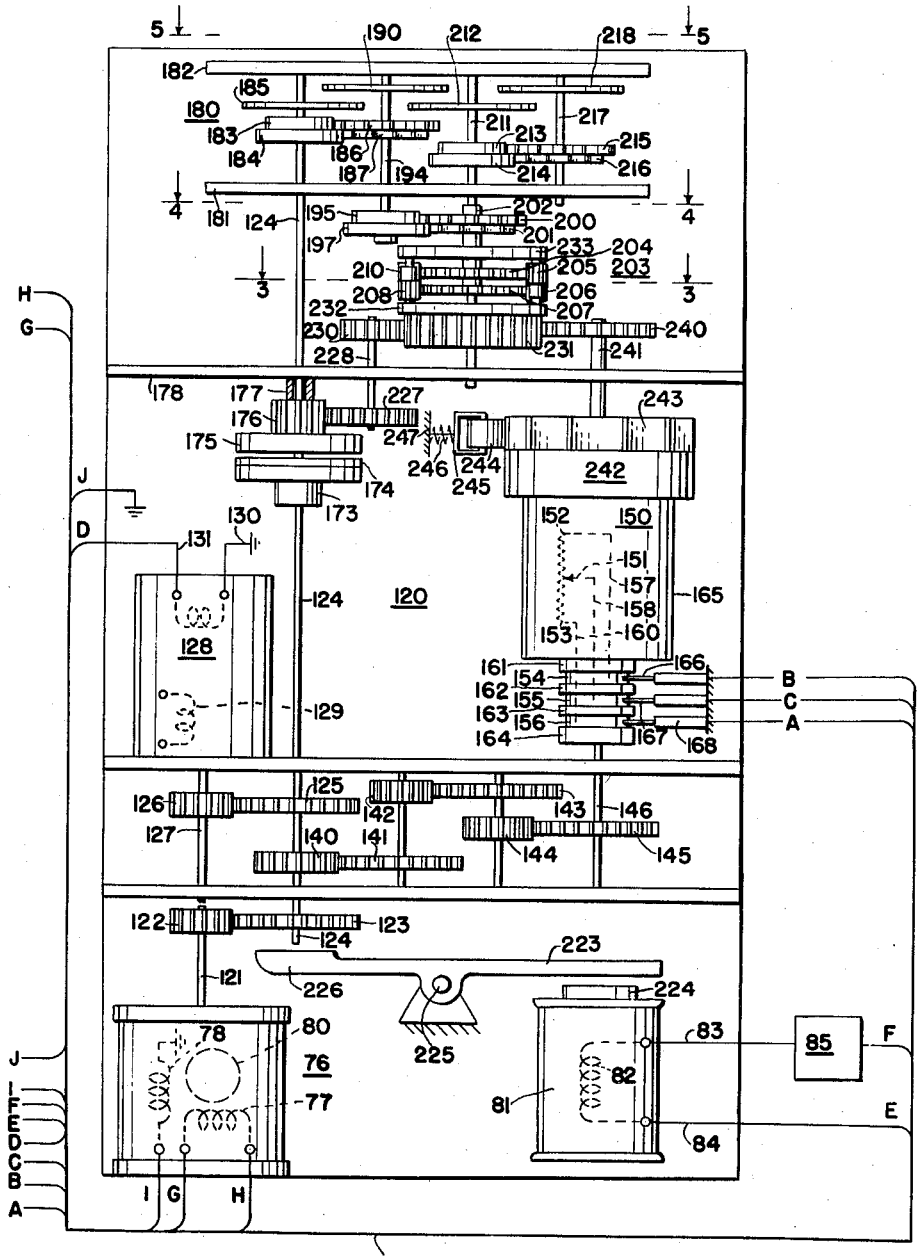
Figure 2 is a top view of the indicator.

There is further shown in Figure 2 a complete mechanical indicator shown generally as 120. Mounted on this indicator is a magnet 81 which has a winding 82 (again shown in phantom) which is connected through leads 83 and 84 to a power supply 85 and connectors E and F. It will be seen that connectors E and F go on part of cable 75 and in turn are connected to connectors E and F shown in Figure 1. Connectors E and F in Figure 1 join conductors 86 and 87 to connect with the relay contacts 32. From this arrangement, it is apparent that when amplifier 30 conducts sufficiently to energize the plate load relay 31 to close contacts 32 that the magnet 81 is also energized.

When indicator motor 76 is in operation it drives a shaft 121 and in turn drives pinion 122. Pinion 122 in turn drives gear 123 which is connected to shaft 124. Shaft 124 in turn drives gear 125, which rotates gear 126. Gear 126 is connected to a shaft 127 which is an input shaft to an A. C. velocity generator generally shown at 128. The primary winding 129 of the velocity generator is connected to an A. C. source (not shown). The secondary winding of the velocity generator 128 is connected to ground at 130 and to a connector D by conductor 131. The connector D is in turn connected to cable 75 and to connector D in Figure 1. The output of the velocity generator 128 is a linear function of the speed of rotation of shaft 127 and therefore is a linear function of the output speed of motor 76. The output of the velocity generator 128 through connector D is fed to a conductor 88, a condenser 90, and a series potentiometer shown at 91. The potentiometer is then grounded at 92 and has a slider 93 so that the proportion of voltage developed across the potentiometer 91 can be selected at will. The output from slider 93 is fed to an amplifier generally shown at 94 and the output of amplifier 94 is connected to a coupling condenser 95 to a mixer amplifier of a known design at 96. The mixing amplifier 96 is further supplied with a signal from potentiometer 97 through the wiper 98. The signal developed across the potentiometer 97 is part of the voltage developed across a voltage divider formed by the potentiometer 97 and resistor 100. This voltage divider combination is further modified by placing a bypass condenser 101 across the potentiometer 97. The voltage supplied to the voltage divider is developed across the rectifier 102 as a function of the output of the amplifier 21 and is provided through the resistor 103. The voltage across rectifier 102 is negative and increases as the signal from amplifier 21 increases thereby varying the gain of mixer 96 with the magnitude of the output of amplifier 21. The combination of signals fed into the mixer amplifier 96 from the amplifiers 94 and 21 provide amplifier 96 with a nonlinear output. The gain of amplifier 96 is relatively constant at extremely small signals from amplifier 21 but becomes progressively smaller as the amplitude of the input signals supplied from amplifier 21 increases. The output of the mixer amplifier 96 is fed through a condenser 104 and resistor 105 to the input of the amplifier 60.

The arrangement of a motor driving a velocity generator and feeding the output of the velocity generator back to the input of the motor control circuit is therefore a closed loop system. This arrangement is utilized for damping purposes in the control of the motor. The arrangement disclosed in this particular invention varies from the conventional damping arrangement in that the signal fed to the mixing amplifier 96 causes an output which is nonlinear in nature and therefore varies the effects of the damping upon the drive motor 76 in accordance with the amplitude of the error signal sensed by the amplifier 21.

Upon energization of the indicator drive motor 76 it has been pointed out that the shaft 121 drives pinion 122, gear 123 and shaft 124. Shaft 124 further drives a series of reduction gears formed of gearing 140, 141, 142, 143, 144 and 145. Gear 145 is connected on shaft 146 so that shaft 146 rotates in conjunction with shaft 124, but at a much slower rate. Shaft 146 is connected to the wiper 151 of a helical potentiometer 150. The helical potentiometer 150 is formed so that the wiper 151 is allowed to be turned through ten complete revolutions for its complete travel from one end 152 to the other end 153 of the resistance winding of the helical potentiometer 150. The potentiometer wiper 151 and the potentiometer ends 152 and 153 are in turn connected to three slip rings 155, 154 and 156 by appropriate leads 158, 157, and 160. The slip rings 154, 155, and 156 are separated and protected by four insulating discs 161, 162, 163, and 164. The combination of the slip rings and the insulating protective members form a unitary member which is fixedly connected to the body 165 of the potentiometer 150. It is apparent from this combination that if the body 165 is caused to rotate, that the slip rings and the insulating protective members rotate in unison with it. Riding upon the slip rings are three wipers 166, 167, and 168 and these contact members are then connected to an insulating member (not shown) in such a manner that they are electrically insulated from one another. Connectors A, B, and C are then in turn connected to the wiper members so that connector A is in circuit with wiper 168, connector C is in circuit with wiper 167, and connector B is in circuit with wiper 166. Connectors A, B, and C are then fed to cable 75 which connects with connector A, B, and C of Figure 1. Connectors A, B, and C in turn connect to conductors 170, 171, and 172. Conductor 170 connects to one end of transformer secondary winding section 18, conductor 171 connects to the other end of the secondary winding section 18 and conductor 172 connects to one side of capacitor 22.

A complete bridge circuit, previously referred to, can now be traced. The bridge consists of the sensing unit 10, the capacitor 22, the transformer winding 18 which is in parallel circuit with the potentiometer 150, and the transformer winding 16. As stated before the input to this bridge circuit is the A. C. energization supplied by the transformer 15 and the output of the bridge circuit is supplied between the grid 20 of tube 21 and ground. The capacity of capacitor sensing unit 10 is continually decreasing in value as the fluid 14 is removed from tank 13. This would tend to unbalance the bridge circuit if it had initially been in a state of balance. To maintain the state of balance the potentiometer wiper 151 is moved from one end of the potentiometer winding 153 toward the other end of the potentiometer winding 152. It can be seen that by appropriate arrangements if the wiper 151 were moved at a rate to correspond with the usage of the fuel 14 from the tank 13 that the bridge could be kept in a constant state of balance. This type of an arrangement is common and is generally referred to as a rebalance system.

When the indicator motor 76 is in operation the shaft 124 is caused to rotate, as previously pointed out. The shaft 124 extends almost the full length of the indicator generally shown at 120 and at the end remote from the indicator motor drives a gear train type indicator generally shown at 180. In the embodiment disclosed, the gear train type indicator is generally made up of a train of Geneva gears and stops to supply intermittent motion to the indicator dials. This type of movement is used extensively and is referred to as a Geneva gear train indicator. The operation of the indicator will be described in detail below. In addition to driving the Geneva gear train indicator 180 the shaft 124 is connected to a disc-like member 173 which in turn has a soft clutch-like surface 174. Rotatably mounted upon shaft 124 and opposing the clutch surface 174 is a second disc-like member 175 which is free to rotate about shaft 124. Directly connected to the disc 175 is a pinion 176 which is also free to rotate about shaft 124 with the disc 175. A spacing member in the form of a loose collar 177 locates the disc 175 and the pinion 176 away from a side plate 178. It is obvious that if shaft 124 were moved in such a manner as to cause the clutch face 174 to frictionally engage disc 175, that the disc 175 and pinion 176 would tend to rotate simultaneously with the shaft 124. The purpose of the coupling arrangement between the shaft 124 and disc 175 will be described in detail below, as will a special differential gear train that couples the output of the shaft 124 and disc 175 to the indicator. Basically however, the differential gear is provided to allow the output of shaft 124 to drive the normal input to indicator 180, while the output of disc 175 also drives the indicator gear train, but at an intermediate point in the indicator gear train. This allows the indicator 180 to be driven at two independent speeds at the same time. Specifically this allows the units digit dial to be driven in a conventional manner while the hundreds digit dial is also driven to account for a sudden, large change in the quantity to be indicated.

The operation of the Geneva gear train 180 can best be understood by referring to Figure 4. The basic function in a Geneva gear is to provide an intermittent gear train operation of a predetermined frequency. In the disclosed application the frequency of operation of one gear with respect to the other is in the ratio of one to ten. This can be seen by considering shaft 194 as an input shaft which is periodically rotated. Fixed to this shaft are two members. The first member is a pinion 195 having a single tooth 196. Also fixed to the shaft is a pinion stop 197 which is simply a disc-like member having a semicircular portion 198 removed from it and in alignment with the tooth 196. As the shaft 194 is rotated the pinion gear 195 and the pinion gear stop 197 therefore also rotate. It can be seen that since the pinion 195 only has one gear tooth 196 that it will only engage the adjoining gear 200 once per revolution. In the example used the gear 200 has ten gear teeth equally spaced around its periphery. Each time the pinion gear 195 engages gear 200, the gear 200 and the gear stop 201, which is connected to gear 200, rotates one tenth of a complete revolution. It should be further pointed out that each time the pinion gear tooth 196 engages the gear 200 that the semicircular opening 198 in the pinion gear stop 197 coincides with a point on the gear stop 201 allowing it freedom of movement. This type of an arrangement can be continued through any number of steps of gearing and with a one to ten ratio the input device must turn ten times for each single turn of the succeeding gear. In this way it is possible to build up an indicator which will progressively count in a decimal manner as the input shaft is turned.

Again referring to Figure 2, the shaft 124 passes through a side plate 181 and is terminated in a side plate 182. As the shaft 124 is rotated it in turn rotates a pinion gear 183, a pinion gear stop 184, and a circular dial 185. The indicator dial 185 has numbers upon it from one to ten and these numbers can be seen from the front of the indicator 120 through a small hole in the side plate 182. This can best be seen by referring to Figure 5. As the pinion tooth gear 183 rotates it engages a pinion gear 186 which in turn drives a gear stop 187 and shaft 194. Shaft 194 then in turn drives the indicator dial 190 and the pinion gear 195. The pinion gear 195 in turn drives the pinion stop 197 and the gear 200 and gear stop 201. The gear 200 and gear stop 201 are both fixed to a sleeve 202 which is connected to a differential gear train arrangement generally shown at 203. The purpose of the differential gearing 203 will become fully apparent later on and the following description will continue the method of rotation of the indicator through the differential gearing 203. As the sleeve 202 rotates it causes a gear 204, which is connected directly to the sleeve 202, to rotate. The rotation of gear 204 drives gears 205 and 210 which in turn drive gears 206 and 208. Gears 206 and 208 in turn cause a larger gear 207 to rotate. It can be seen from this arrangement that the input to sleeve 202 in causing gear 204 to rotate causes a counter revolution of gear 207. The gear 207 is connected to shaft 211 and the rotation of shaft 211 causes indicator 212 to rotate. The relationship of the Geneva gears and members from 194 through 201, the shaft 202, and gears 204 through 210 can best be seen from Figures 3 and 4. Figures 3 and 4 are an exploded isometric view of the gear system generally shown at 203.

As the shaft 211 rotates moving the indicator 212, the pinion gear 213 and pinion stop 214 are caused to rotate. The pinion gear 213 then causes the gear 215 and the gear stop 216 to also rotate. The rotation of the gear 215 imparts rotation to shaft 217 which in turn rotates the indicator 218. It should be pointed out that any number of further indicator members could be added to this arrangement for totalizing digits in excess of four figures.

Figure 5 discloses the front view of the indicator and shows clearly how the indicator dials are read. The figures from indicator 218 are disclosed through a hole 220 in side plate 182. Additional holes 221 and 222 disclose numbers from the indicator dials 212 and 190 respectively. It should be further pointed out that if for some reason the first input dial were not the units digit that it would merely be necessary to indicate on the face of the indicating device additional fixed zeros or decimal points to provide the correct, direct reading.

It was previously indicated that under certain signal conditions relay 31 would be energized. On energization of the winding of the relay 31 the contacts 32 close and cause magnet 81 to be energized. The energization of magnet 81 causes the armature 223 to be pulled downward against the pole face 224 of magnet 81. The armature 223 is pivoted at point 225 so that the end 226 of armature 223 is moved into engagement with the end of shaft 124. The pressure applied on the end of shaft 124 causes the disc 173 to move the clutch surface 174 into engagement with the clutch disc 175. This engagement between the clutch surface 174 and disc 175 causes the pinion 176 to rotate with shaft 124 and in turn causes a rotation of gear 227, shaft 228, gear 230, and gear 231. The rotation of gear 231 directly drives plate 232. The movement of plate 232 is transmitted to plate 233 by the shafts forming parts of gears 205, 206, 208, and 210. The rotation of plate 232 of the differential gearing 203 causes the gear member 207 of the differential gear arrangement to be rotated. At the same time gear 207 is rotated, it causes the rotation of shaft 211. It is apparent therefore that the shaft 211 can be rotated by either of two input means. These two means are basically composed of either the drive shaft 124 driving the indicator 180 and causing the Geneva gear train movement to function in a conventional manner, or the rotation of shaft 124 imparting rotation through the clutch member 174 and clutch disc 175 to the indicator through the differential gearing 203. With this arrangement it is possible to drive the indicator 212 at two different speeds depending on whether or not the clutch 174 is engaged with the clutch disc 175.

The rotation of gear 231 directly drives gear 240 and gear 240 is fixedly attached to the shaft 241. The shaft 241 passes through the side plate 178, which also acts as a bearing surface, and is connected to a disc generally shown at 242. The disc 242 is rigidly attached to the outside casing 165 of the helical potentiometer. It is therefore apparent that as the gear 240 is driven that the outside casing 165 of the helical potentiometer is also rotated. The disc member 242 further is constructed to have ten depressions equally spaced about the periphery of its end member 243. This arrangement can best be seen in Figure 3. Riding on the depressions in the periphery of member 243 is a roller 244 which is in turn supported for rotation by a yoke 245. The yoke 245 is attached to a spring member 46 which is then in turn supported by the base 247 of the indicator 120. The spring arrangement consisting of a spring 246, the yoke 245, and the roller 244 provides mechanical bias or detent against the disc 243 to generally hold the casing 165 of the helical potentiometer from moving, except when the clutch 174 is engaged with the disc 175. The engagement of the clutch disc surface 174 with plate 175 causes a direct gear train rotation to overcome the biasing effect of spring 246 and causes the body 165 of the helical potentiometer to be rotated.

*Operation*

The operation of this novel high speed indicator can best be understood by first considering the normal operation and then the high speed operation.

A normal operation of the high speed indicator is governed by the rate of use of the fuel 14 from the tank 13. As the fuel level in tank 13 drops the capacitor sensing unit 10, which originally can be considered to have been in a state causing the bridge to be balanced, causes an unbalance of the bridge. The unbalance of the sensing bridge supplies a phased signal to the amplifier 21 and this signal is then fed directly to amplifier 30, amplifier 60, and to one input circuit of the mixing amplifier 96. In the normal operation the signal fed to the amplifier 30 is not adequate to overcome the bias on this circuit and therefore the relay 31 is not energized. The signal supplied to the amplifier 60 is further amplified and supplied to the discriminator shown at 62. Depending on the phase and magnitude of the signal supplied to the discriminator 62 either winding 65 or 66 causes a current flow in the conductor 68 which is connected to the center tap 67 of the discriminator 62. The current flow in conductor 68 through connector I energizes the indicator motor 76 to cause it to rotate at a proportional speed and in a direction determined by the phase of the unbalance signal in the sensing unit 10. As pointed out before, the rotation of indicator motor 76 causes the velocity generator 128 to be rotated and the feedback from the velocity generator 128 through the conductor 131 and connector D is supplied to a feedback amplifier 94. The feedback amplifier 94 supplies an output to the mixer amplifier 96 which is combined with the signal supplied from the potentiometer 97 and the resulting damping signal is then fed from the amplifier 96 to the input of the amplifier 60 through the condenser 104 and resistor 105. This operation as pointed out before supplies the damping necessary to keep the indicator motor 76 operating without overshooting or hunting. The operation of indicator motor 76 further drives the gears 123 and 140. The operation of gear 123 drives shaft 124 and causes the Geneva indicator generally shown at 180 to be activated.

The operation of the Geneva indicator generally shown at 180 causes a totalized operation through the Geneva gear train, which has been previously discussed, and provides an indication by rotating the indicator discs 185, 190 212, and 218.

The operation of the indicator motor 76 causes the gear 140 to be rotated which in turn rotates gears 141, 142, 143, 144, 145, and shaft 146. The shaft 146 is coupled directly to the potentiometer wiper 151 and causes a variation in voltage between the potentiometer wiper 151 and the ends of the potentiometer windings 152 and 153. The change in output of voltage across the potentiometer 150 is transmitted to the slip rings 154, 155, and 156 and further conducted to the brushes 166, 167, and 168. It is apparent therefore that the output from the indicator motor 76 causes a change in output across the connector leads A, B, and C. The change in output from connectors A, B, and C is fed back to the bridge circuit causing it to rebalance the bridge at the rate of change of the voltage across the sensing indicator 10.

If it is necessary to switch from one tank to another, or if for some reason there is a sudden change in the level of fuel in tank 13, there is also a sudden change in the unbalance of the bridge circuit and a large signal is supplied to the input grid 20 of the amplifier 21. Under normal operation a large change of fuel would require an appreciable length of time for the indicator 180 to be driven to the proper indication and for the follow-up potentiometer 150 to rebalance the bridge circuit. This length of time is undesirable and is compensated for by the following operation of the high speed indicator system. The large signal supplied to the amplifier 21 is again fed to the amplifiers 30, 60, and 96. The input to the amplifier 30 is in this case large enough to overcome the bias developed across resistor 51 and to cause the amplifier 30 to conduct sufficiently to energize the relay 31. Energization of relay 31 closes the relay contacts 32 and energizes the magnet 81 through connector leads E and F. As soon as the magnet 81 is energized the armature 223 is pulled down against the pole face 224 causing the tip of the armature 226 to engage the end of shaft 124. This engagement shifts the shaft 124 in such a manner that the clutch disc face 174 engages the disc 175 and causes the associated gear train which is connected to 175 to be activated. The operation of the amplifier 60 and amplifier 96 is the same in this abnormal or high speed mode as it is in the normal operation and the amplifier 60 causes the discriminator 62 to provide a signal to the indicator motor 76 to drive the indicator motor in the proper direction and at a high speed. The indicator motor further drives the velocity generator and a signal is fed back to the amplifier 96 for damping purposes once again. In this particular case the damping signal would tend to be much larger than that previously received but the signal from the velocity generator is lessened by the voltage developed across 97 and therefore provides a lesser damping signal than if the device were strictly of a linear nature. This type of feedback damps the indicator operation for ease of reading but still provides a rapid response to large changes in the quantity being measured. It is understood that this nonlinear amplifier is strictly an improvement on the indicating system and that the nonlinear features could be replaced by a linear amplifier arrangement.

The high speed operation of the indicator motor 76 when the clutch face 174 is engaged to disc 175 causes an input to be placed directly on the potentiometer case 165 through the gear trains 176, 227, 230, 231, 240, and shaft 241. As pointed out before, the rotation of the gear 230 causes the shaft 211 to also rotate and the gear arrangement is selected in such a manner that the indicator 212 through the shaft 211 is caused to move up at a rapid rate. The rotation of the case of the potentiometer 165 causes the wiper 151 and winding of the potentiometer to move relative to each other. This relative movement causes large steps of resistance change and in this way causes a rebalance of the bridge in an extremely rapid rate.

As can be seen from this description the rebalance means on the high speed operaiton causes two basic functions which are not in operation during normal conditions. The first of these is the additional input to shaft 211 to cause the indicator 212 to rotate rapidly, and secondly this rotation is synchronized with the rotation of the casing 165 of the helical potentiometer to cause a rapid rebalance of the bridge. With this arrangement it is possible to step an indicator up to a rate much higher than that possible through the conventional drive of the Geneva gear. The rapid change in fuel level, mentioned previously as resulting from possible switching of tanks or dropping of a fuel tank by an airplane, is therefore adjusted for rapidly and the indication is brought to the proper reading almost at once.

The disclosure provided is by way of example only and it is obvious that this type of an indicating device could easily be used on numerous types of systems. The capacitor indicator unit 10 could be replaced in fact by any type of sensing device which causes a continuous change in voltage or current and the appropriate components could be placed in the bridge to cause its rebalance. Therefore this indicator could be used in many types of electrical, mechanical, or hydraulic systems. Since the disclosure was presented to be illustrative only I wish it understood that I am to be limited only by the appended claims.

I claim as my invention:

1. In a high speed indicator, in combination, a sensing means including an output means and a rebalance means having two relatively movable members, an amplifier responsive to said output means and having first and second outputs, a phase sensitive amplifier and an indicator drive motor energizably controlled by said amplifier first output, a clutch energizably controlled by said amplifier second output upon a predetermined magnitude of said second output, a gear train movement indicator having a plurality of gears, a first gear and said clutch rotated by said indicator motor, a differential gear train engaged to an intermediate gear and geared to a first relatively movable member of said rebalance means to drive said intermediate gear and said first member simultaneously when said clutch is energized, means to drive a second relatively movable member of said rebalance means with said indicator motor, a velocity generator driven by said indicator motor, a non-linear feedback amplifier energized by said velocity generator and having an output connected to said phase sensitive amplifier, said indicator motor to drive said second relatively movable member and said indicator to rebalance said sensing means and to drive said first relatively movable member and said intermediate gear to rebalance said sensing means when said amplifier second output is above the predetermined level.

2. In a high speed indicator, in combination, a sensing means including an output means and a rebalance means having two relatively movable members, a phase sensitive amplifier having two outputs and an indicator drive motor energizably controlled by said amplifier first output, a clutch energizably controlled by said amplifier second output upon a predetermined magnitude of said second output, a gear train movement indicator having a plurality of gears, a first gear and said clutch rotated by said indicator motor, a differential gear train engaged to an intermediate gear and geared to a first relatively movable member of said rebalance means to drive said intermediate gear and said first member simultaneously when said clutch is energized, means to drive a second relatively movable member of said rebalance means with said indicator motor, a velocity generator driven by said indicator motor, a nonlinear feedback amplifier energized by said velocity generator and having an output connected to said phase sensitive amplifier, said indicator motor to drive said second relatively movable member and said indicator to rebalance the sensing means and to drive the first relatively movable member and the intermediate gear to balance said sensing means when said amplifier second output is above the predetermined level.

3. In a high speed indicator, in combination, a sensing means including an output means and a rebalance means having two relatively movable members, a phase sensitive amplifier having two outputs and an indicator drive motor energizably controlled by said amplifier first output, a clutch energizably controlled by said amplifier second output upon said output attaining a predetermined magnitude, a gear train movement indicator having a plurality of gears, a first gear and said clutch rotated by said indicator motor, a differential gear train engaged to an intermediate gear and geared to a first relatively movable member of said rebalance means to drive said intermediate gear and said first member simultaneously when said clutch is energized, means to drive a second relatively movable member of said rebalance means with said indicator motor, said indicator motor to drive said second relatively movable member and said indicator to rebalance said sensing means and to drive the first relatively movable member and the intermediate gear to rebalance said sensing means when the amplifier second output is above the predetermined level.

4. In a high speed indicator, in combination, a sensing means including an output means and a rebalance means having two relatively movable members, a phase sensitive amplifier having two outputs and an indicator drive motor energizably controlled by said amplifier first output, a clutch energizably controlled by said amplifier second output upon said output attaining a predetermined level, a gear train movement indicator having a plurality of gears, a first gear and said clutch rotated by said indicator motor, a differential gear train engaged to an intermediate gear and geared to a first relatively movable member of said rebalance means to drive said intermediate gear and said first member simultaneously when said clutch is energized, means to drive a second relatively movable member of said rebalance means with said indicator motor, a velocity generator driven by said indicator motor, a feedback amplifier energized by said velocity generator and having an output connected to said phase sensitive amplifier, said indicator motor to drive said second relatively movable member and the indicator to rebalance the sensing means and to drive said first relatively movable member and the intermediate gear to rebalance said sensing means when the amplifiers second output is above the predetermined level.

5. In a device of the class described, in combination, an indicator having a plurality of input means, a drive means for driving a first of said input means, connection means selectively energized by an abnormal magnitude of the condition to be indicated to cause said drive means to be connected to a second of said input means to thereby cause said second input means to actuate said indicator at a rate substantially different from said first input means.

6. In an indicator, the combination comprising an amplifier having an input and having a first and a second output the magnitudes of which are a function of the input, an indicator drive motor energizably controlled by the first output of said amplifier, a clutch energizably controlled by the second output of said amplifier upon a predetermined magnitude of the second output, a gear train movement indicator having a plurality of gears, a first gear and said clutch rotated by said indicator drive motor, and a differential gear train engaged to an intermediate gear, said intermediate gear being driven at a first rate and a second substantially different rate dependent upon whether said clutch is energized.

7. In an indicator, the combination comprising: a positioning means for said indicator, a motion combining means operatively connected to said positioning means, a first input means operatively connected to said motion combining means, a second input means, connection means selectively operable to connect said second input means to said motion combining means, and drive means being responsive to the output signal of a sensing means to cause said first input means to actuate said motion combining means, said drive means being responsive to a predetermined magnitude of the output signal of the sensing means to selectively connect the second input means to said motion combining means by means of said connection means to thereby cause said second input means to actuate said motion combining means, and thereby said positioning means at a rate substantially different from said first input means.

8. In an indicator, in combination, signal responsive means, having a first and a second output, an indicator drive motor controlled by a first output of said means, a clutch energizably controlled by the second output of said means, a gear train movement indicator having a plurality of gears, a first gear and said clutch rotated by said indicator drive motor, a differential gear train engaged to an intermediate gear to drive said intermediate gear when said clutch is caused to be energized, said clutch being energized upon the second output of said means attaining a predetermined magnitude and to thereby substantially change the rate at which said intermediate gear is rotated.

| | | |
|---|---|---|
| 925,403 | Van Volkenburg | June 15, 1909 |
| 1,993,720 | Nye | Mar. 5, 1935 |
| 2,421,560 | Haynes | June 3, 1947 |
| 2,429,427 | Rieber | Oct. 21, 1947 |
| 2,454,520 | Moore | Nov. 23, 1948 |
| 2,551,943 | Gulow | May 8, 1951 |
| 2,588,613 | Burrill | Mar. 11, 1952 |